United States Patent [19]
Morikawa et al.

[11] Patent Number: 5,769,341
[45] Date of Patent: Jun. 23, 1998

[54] STABILIZED CRUSHING DEVICE

[75] Inventors: Sumio Morikawa; Toshiji Ohga; Nobuyuki Zakohji, all of Osaka, Japan

[73] Assignee: Ohyodo Diesel Co., Ltd., Osaka, Japan

[21] Appl. No.: 785,949

[22] Filed: Jan. 22, 1997

[30] Foreign Application Priority Data

Oct. 15, 1996 [JP] Japan .................................. 8-272428

[51] Int. Cl.[6] ...................................................... B02C 1/06
[52] U.S. Cl. ...................................... 241/266; 241/101.73
[58] Field of Search ............................. 241/101.73, 262, 241/264, 291, 266; 30/134

[56] References Cited

U.S. PATENT DOCUMENTS 4,951,886  8/1990  Berto ................................. 241/101.73
5,478,019  12/1995  Morikawa et al. ................. 241/101.73
5,636,802  6/1997  Tagawa ..................................... 241/266
5,645,236  7/1997  Sugiura et al. .......................... 241/266

Primary Examiner—John M. Husar
Attorney, Agent, or Firm—Morrison Law Firm

[57] ABSTRACT

A cutting/crushing device for the demolition of buildings has a pair of jaws that pivot on frame. The jaws are constrained to pivot in synchrony because each jaw remains engaged with a guide pin which substantially prevents relative movement of the two jaws. The guide pin is guided by a slot in the frame, aligned with a plane of symmetry between the two jaws, to prevent it from moving toward or away from either jaw. By guiding the guide pin in this way, frictional binding and wear of the guide pin are minimized. In addition, the shape of the recesses into which the guide pin fits can have smaller tolerances reducing play between the two jaws. Stoppers on the frame press against the rotatable jaws when they are filly opened to prevent any play.

20 Claims, 6 Drawing Sheets

STABILIZED CRUSHING DEVICE

BACKGROUND OF THE INVENTION

This invention relates to a crushing device attachable to an end of a manipulator of various kinds of construction equipment such as a cherry-picker. More particularly the invention relates to a device for the low-noise crushing and destruction of buildings made of materials such as steel-reinforced concrete.

Crushing devices that use pairs of rotatable jaws that are opened and symmetrically by hydraulic cylinders are known (see Japanese Laid-Open Publication Number 2-232470). Referring to FIGS. 5–7, a crushing device according to the prior art has a pair of rotating jaws 1 capable of cutting and crushing steel-reinforced concrete or similar material. Each rotating jaw 1 pivots on a bearing 1b about a pivot pin 5 passing through rotating jaw 1 at its middle. bearings 1b are supported by a frame 2.

Rotating jaws 1 are opened and closed by a hydraulic actuator 6. assembly. Ends 1a of rotatable jaws 1 project from a forward end of frame 2. An object to be cut or crushed is placed between rotating jaws 1 when they are open. The object is then crushed when rotating jaws 1 close.

Hydraulic actuator 6 is sized to insure rotatable jaws 1 close with sufficient force to crush building material. Rear ends 1c extending behind frame 2, are forced apart by hydraulic actuator 6. Hydraulic actuator 6 comprises a cylindrical main unit 7 and a piston rod 8. The base end of main cylinder unit 7 and the end of piston rod 8 are rotatably connected to rear ends 1c of rotatable jaws 1 by cylinder pins 9. Oil-pressure cylinder 6 passes through a space in the rear of frame 2. Retraction and extension of hydraulic actuator 6 opens and closes rotatable jaws 1 about pivots 5.

Frame 2 attaches at its rear to attachment bracket 4 via a swivel brake mechanism 3. Swivel brake mechanism 3 permits bracket 4 to be pivoted about an axis that runs through the intersection of the two perpendicular planes of bilateral symmetry of the frame 2/rotating jaw 1. This enables the frame to change orientation of the rotatable jaws as required. The application of a brake force perpendicular to the plane of FIG. 5 maintains the frame at a desired position. Attachment bracket 4 is connected via a pin 4a to the end of a rotatable jaw 10 of a cherry-picker or similar device so that it can be rotated up or down about an axis perpendicular to the drawing plane.

Referring to FIGS. 7(A)–7(C), each rotatable jaw 1 has an arcuate bearing end surface m of bearing 1b with a center of curvature located at the center of a corresponding one of pivots 5. Roughly semi-circular cavities 11 interrupt adjacent portions of bearing end surfaces m. The centers of curvature of each semicircular cavity is located on the cylindrical surface of curvature defining the corresponding bearing end surface m. A circular synchronization pin 12 fits between cavities 11. Semi-circular cavities 11 have identical curvatures, close to, but slightly larger than, the curvature of cylindrical guide pin 12. Synchronization pin 12 remains engaged in cavities 11 throughout a range of opening and closing of rotating jaws 1. Synchronization pin 12 forces rotatable jaws 1 to rotate symmetrically, thereby maintaining a constant relationship between rotating jaws as hydraulic actuator 6 is opened and closed.

As described above, rotatable jaws 1 open and close in substantial synchrony by means of synchronization pin 12. Even if a large load is applied to one jaw, synchronization pin 12 insures synchronous movement of both rotatably jaws 1. This synchronous movement is desirable from the standpoint of ease of use, and from the standpoint of the machine's durability and life-span.

Referring to FIGS. 5 and 7(A), when piston rod 8 of hydraulic actuator 6 is retracted fully, rotatable jaws 1 are opened to a maximum opening width W2. In this position, there is a gap G2 between synchronization pin 12 and the two cavities 11 as shown in FIG. 7(A) (the drawing is exaggerated for the purposes of illustration). When rotating jaws 1 are in an open position, synchronization pin 12 falls into cavity 11 of the lower rotatable jaw 1 due to its own weight. This forms a maximum gap G2 between cavity 11 and upper rotatable jaw 1.

Referring to FIGS. 6 and 7(C), when piston rod 8 of hydraulic actuator 6 is extended all the way, rotatable jaws 1 are in a closed position. As shown in FIG. 7(C) a gap G2 forms between synchronization pin 12 and cavities 11 which is similar to the gap G2 shown in FIG. 7(A).

Referring to FIG. 7(A)–7(C), when rotatable jaws 1 are in the closed position, cavities 11 and synchronization pin 12, ideally, would have the relationship shown in FIG. 7(B) with almost no gap. With this relationship, both rotatable jaws 1 would open in perfect synchrony. The same is true when rotatable jaws 1 are in the open position. Ideally, no gap would form when rotatable jaws 1 move to the opened position so that rotatable jaws 1 would close in perfect synchrony.

Note that even if the gap between cavities 11 and synchronization pin 12 is set to a very magnitude when rotatable jaws 1 are closed, the gap will increase in size as rotatable jaws 1 are opened. Referring to FIG. 7(A), when rotatable jaws 1 are opened to their maximum width, gap G2 is also maximized. As gap G2 gets larger, there is an increased degree of rotational freedom of rotatable jaws 1 around pivots 5. This greater mechanical play results in a looseness of rotatable jaws 1. Thus, the wider that rotatable jaws 1 are opened, the larger gap G2 becomes. The loose rotatable jaws 1 are less stable and more difficult to handle making it difficult to crush large objects. Furthermore, the above considerations limit the maximum opening width W2 of rotatable jaws 1 to avoid too large a gap forming. This, in turn, limits the maximum size of the object to be cut or crushed.

In addition, when rotatable jaws 1 are closed, beginning from a position where gap G2 is large, the contact between cavities 11 and synchronization pin 12 becomes unbalanced, resulting in pinching and increased friction. Thus, as gap G2 is increases in magnitude, synchronization pin 12 tends to move toward one or the other of cavities 11 of rotatable jaws 1, thereby increasing the possibility of frictional binding.

This unbalanced frictional engagement often causes synchronization pin 12 to wear quickly and become distorted in shape, further destabilizing the rotatable jaws. In fact, there are often cases where, after one operation at a single construction site, the synchronization pin wears significantly and has to be replaced. This replacement is difficult and time consuming because the crushing device is extremely heavy. This is a serious drawback to the prior art device.

OBJECT AND SUMMARY OF THE INVENTION

It is an object of the present invention is to provide a cutting/crushing device with jaws that move in synchrony without play irrespective of their opening angle.

It is another object of the present invention to provide a cutting/crushing device with increased opening width of the cutting/crushing jaws.

It is still another object of the present invention to provide a cutting/crushing device with long life-span of the synchronization pin used to open and close the jaws in synchrony.

Briefly, a cutting/crushing device for the demolition of buildings has a pair of jaws that pivot on frame. The jaws are constrained to pivot in synchrony because each jaw remains engaged with a guide pin which substantially prevents relative movement of the two jaws. The guide pin is guided by a slot in the frame, aligned with a plane of symmetry between the two jaws, to prevent it from moving toward or away from either jaw. By guiding the guide pin in this way, frictional binding and wear of the guide pin are minimized. In addition, the shape of the recesses into which the guide pin fits can have smaller tolerances reducing play between the two jaws. Stoppers on the frame press against the rotatable jaws when they are fully opened to prevent any play.

According to an embodiment of the present invention a pair of rotatable jaws are rotatably supported on a frame via separate pivots. Semi-circular cavities are formed facing the end surfaces of the rotatable jaws at equidistant positions from the pivots. An hydraulic actuator extends and retracts to open and close the jaws. A circular synchronization pin is fitted between the cavities to open and close the two rotatable jaws in a synchronized manner in opposite directions.

The ends of the synchronization pin are slidably engaged to the frame. A guide hole regulates the direction of the displacement of the synchronization pin when the rotatable jaws open and close. This causes the synchronization pin to move along a center line between the two rotatable jaws.

According to an embodiment of the invention, the displacement direction of the synchronization pin, which moves forward and backward when the rotatable jaws open and close, is restricted by the guide hole on the support frame in the direction of the center line between the rotatable jaws.

The guide hole formed on the support frame is a slot-shaped hole that passes all the way through a groove-shaped cavity aligned with the orientation of the center line between the two rotating jaws. The ends of the synchronization pin are slidably engaged in the guide hole. When the rotatable jaws are opened or closed, the direction of displacement of the synchronization pin is regulated so that it lies along the center line between the two rotatable jaws.

Since the displacement of the synchronization pin is regulated, it becomes feasible to decrease the curvature of the cavity in which the synchronization pin resides to approach the size of the curvature of the synchronization pin. This causes a decreased gap between the synchronization pin and cavity, thereby limiting the looseness in the rotatable jaws when opened all the way.

A decreased gap also minimizes unevenness in the amount that each of the rotatable jaws open, and lessens the impact on the synchronization pin when the rotatable jaws open and close. Thus, the efficiency of the rotatable jaws is improved when the jaws are opened.

Additionally, this decreased gap allows an increase in the maximum width that the rotatable jaws can open, providing a high performance crushing device capable of crushing larger objects.

Furthermore, since the guide holes on the support frame keep the synchronization pin at roughly the midpoint position between the cavities of the rotatable jaw, the synchronization pin is always kept in balanced frictional engagement with the cavities. This reduces the wear and deformation on the synchronization pin, thus increasing its life-span.

The oil-pressure cylinder used here to open and close the pair of rotatable jaws can be a single cylinder used by both rotatable jaws, or two cylinders that independently open and close each rotatable jaw.

According to an embodiment of the invention, a pair of rotatable jaws are opened all the way and the rotatable jaws press against the stoppers on the support frame. This keeps the maximum space between the rotatable jaws even, and reliably limits the looseness that accompanies uneven opening of the jaws. This allows easier handling of the rotatable jaws when they are opened, making it possible to set the maximum opening width larger than previously set.

The pair of stoppers on the support frame described here can be claw-shaped stoppers projecting integrally from both sides of the rear end of the support frame. When the rotatable jaws are opened to the prescribed maximum opening width, the rear ends of the jaws would press against the ends of the stoppers on the support frame. The stoppers on the support frame result in almost zero looseness when the rotatable jaws are opened at a maximum. This improves the efficiency of the rotatable jaws in crushing operations.

According to an embodiment of the present invention, there is provided, a cutting/crushing device, comprising: a frame, two jaws pivotally mounted on the frame in a substantially symmetrical arrangement defining a plane of symmetry, the plane of symmetry lying between the two jaws, an actuator connected to at least one of the two jaws, a guide recess on each of the two jaws, a synchronization element guided for movement with respect to the frame along a line in the plane of symmetry, the synchronization element fitting into each of the guide recesses such that as one of the two jaws is pivoted, the other of the two jaws pivots substantially symmetrically in synchrony therewith.

According to another embodiment of the present invention, there is provided, a cutting/crushing device, comprising: a frame, two jaws, each having a forward end, a rear end, and a central portion, each of the two jaws being pivotally mounted on the frame to pivot about a pivot point in the central portion, the two jaws being positioned in a substantially symmetrical arrangement defining a plane of symmetry, the plane of symmetry lying between the two jaws, an actuator having two actuator ends, each actuator end connected to a different one of the rear ends, whereby the rear ends are forcibly separated and brought together to open and close the forward ends, each of the two jaws having at least one arcuate surface with a center of curvature at the pivot point of the each of the two jaws, the arcuate surfaces being adjacent, at least one guide recess on each of the two jaws in the arcuate surface of the each of the two jaws, whereby the crushing device has at least two guide recesses, each of the at least two guide recesses being located opposite another of the at least two guide recesses in a substantially symmetric arrangement about the plane of symmetry, at least one synchronization element guided for movement with respect to the frame along a line in the plane of symmetry, the at least one synchronization element fitting into a respective opposite pair of the at least two the guide recesses such that as one of the two jaws is pivoted, the other of the two jaws pivots substantially symmetrically in synchrony therewith.

According to still another embodiment of the present invention, there is provided, a cutting/crushing device, comprising: a frame, two working members, each having a working end, each of the two working members being pivotally mounted on the frame, pivot points of the two working members being located on the frame such that working ends of the two working members may converge and diverge, a guide element movably attached to the frame for movement along a line, respective portions of the working members having engagement surfaces positioned to engage the guide element at all points throughout a range of pivoting of the working members, the engagement surfaces and the guide element being so shaped, and the pivot points being so positioned, that the working members are forced to pivot in substantial synchrony in opposite directions about respective ones of the pivot points.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
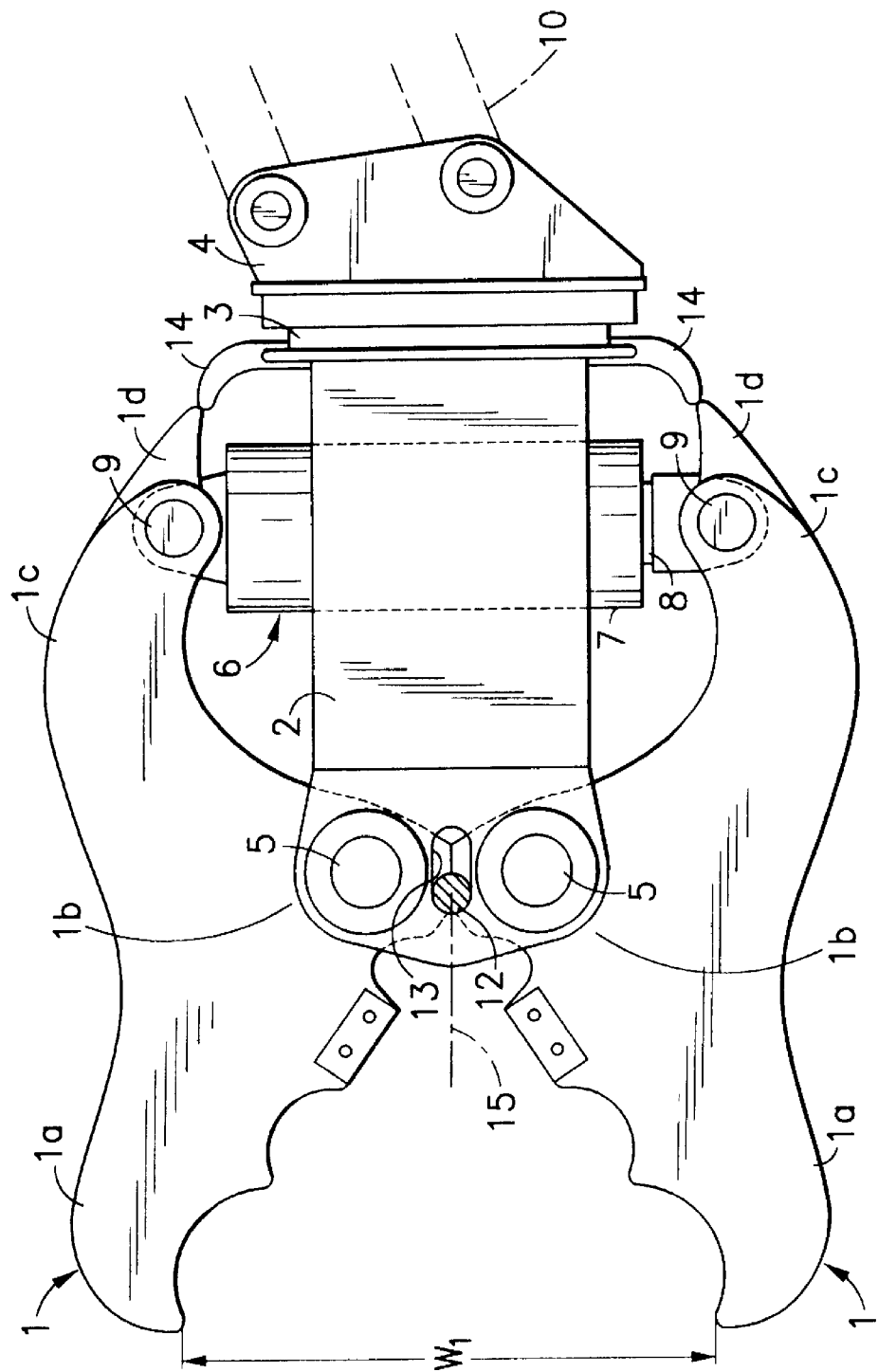
FIG. 1 is a side-view and partial cross-section of a jaw mechanism, with rotatable jaws, in an open position, according to an embodiment of the present invention.
Figure 2:
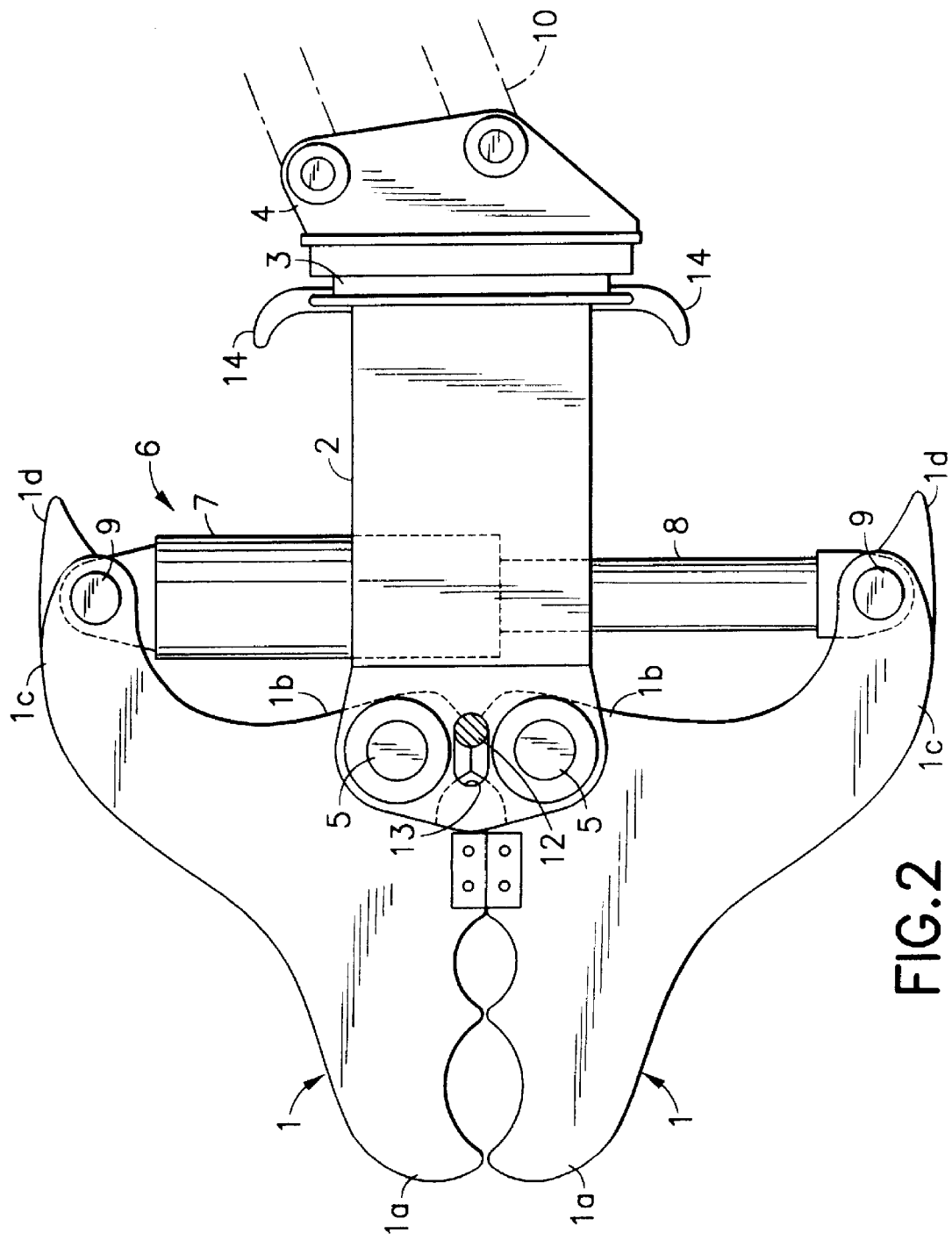
FIG. 2 is a side-view of the device in FIG. 1 in a closed position.

Referring to FIGS. 1 and 2, a stabilized crushing device according to an embodiment of the present invention has a synchronization pin 12 fitted between cavities 11 forming bearing end surfaces m of rotatable jaws 1. This portion of the structure is substantially as in the prior art device described above. In the embodiment of the invention, however, ends of synchronization pin 12 are slidably engaged in a guide slot 13 in support frame 2. When rotatable jaws 1 are opened to a maximum width W1 (as shown in FIG. 1) rear ends 1c press against a pair of stoppers 14 formed at the rear end of frame 2.

Rotatable jaws 1 pivot on bearings 1b comprising pivots 5 fitted into frame 2. A single hydraulic actuator 6 bridges rear ends 1c of rotatable jaws 1. The retraction and extension of hydraulic actuator 6 causes rotatable jaws 1 to rotate around pivots 5, opening and closing ends 1a of rotatable jaws 1.

Frame 2 attaches at its rear to attachment bracket 4 via a swivel brake mechanism 3. Swivel brake mechanism 3 permits bracket 4 to be pivoted about an axis that runs through the intersection of the two perpendicular planes of bilateral symmetry of the frame 2/rotating jaws 1. This enables the frame to change orientation of the rotatable jaws as required. The application of a brake force perpendicular to the plane of FIG. 1 maintains the frame at a desired position. Attachment bracket 4 is connected via a pin 4a to the end of a rotatable jaw 10 of a cherry-picker or similar device so that it can be rotated up or down about an axis perpendicular to the drawing plane.

Figure 4:
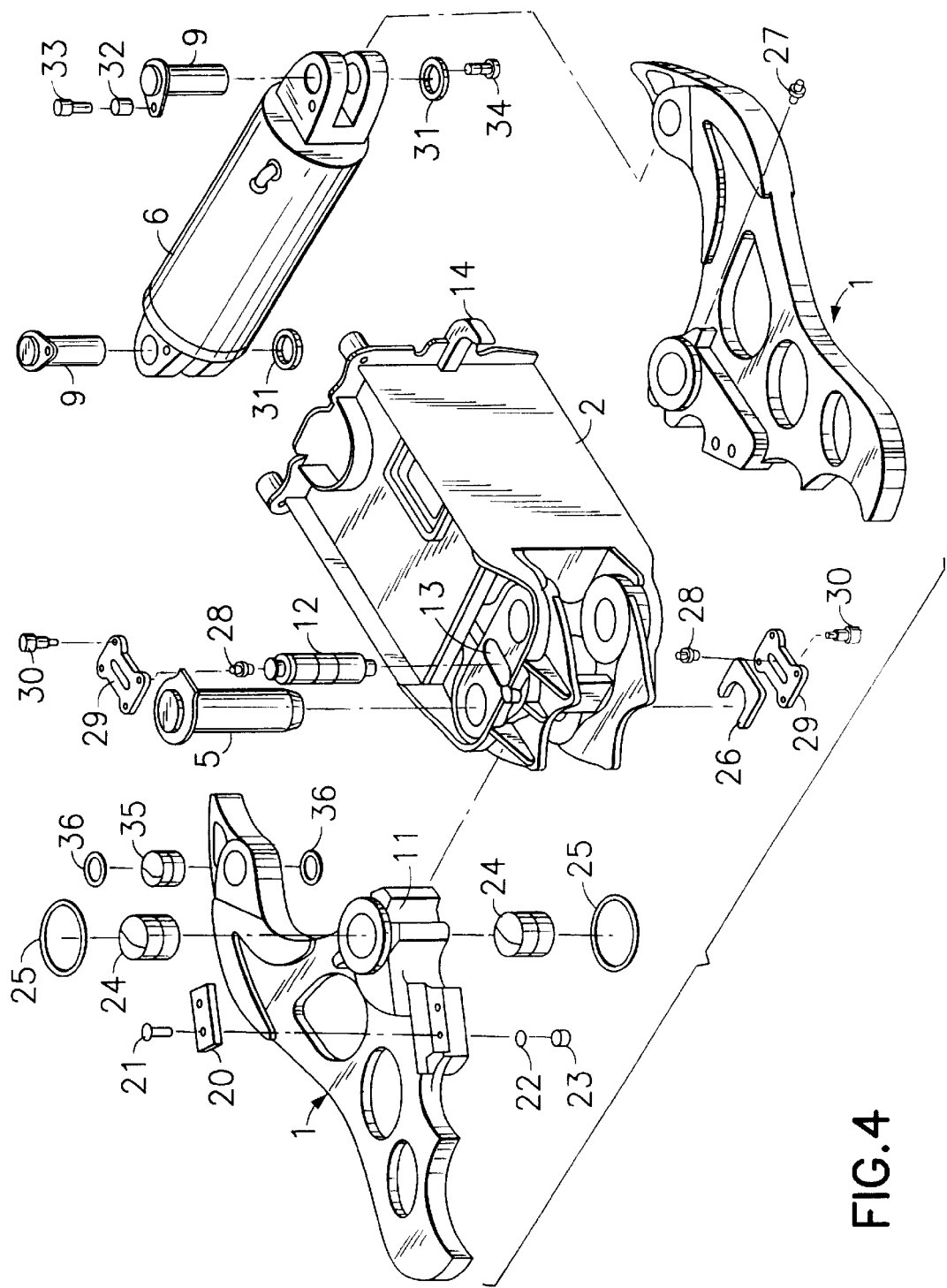
FIG. 4 is an exploded perspective drawing of the jaw mechanism of FIG. 1.
Figure 5:
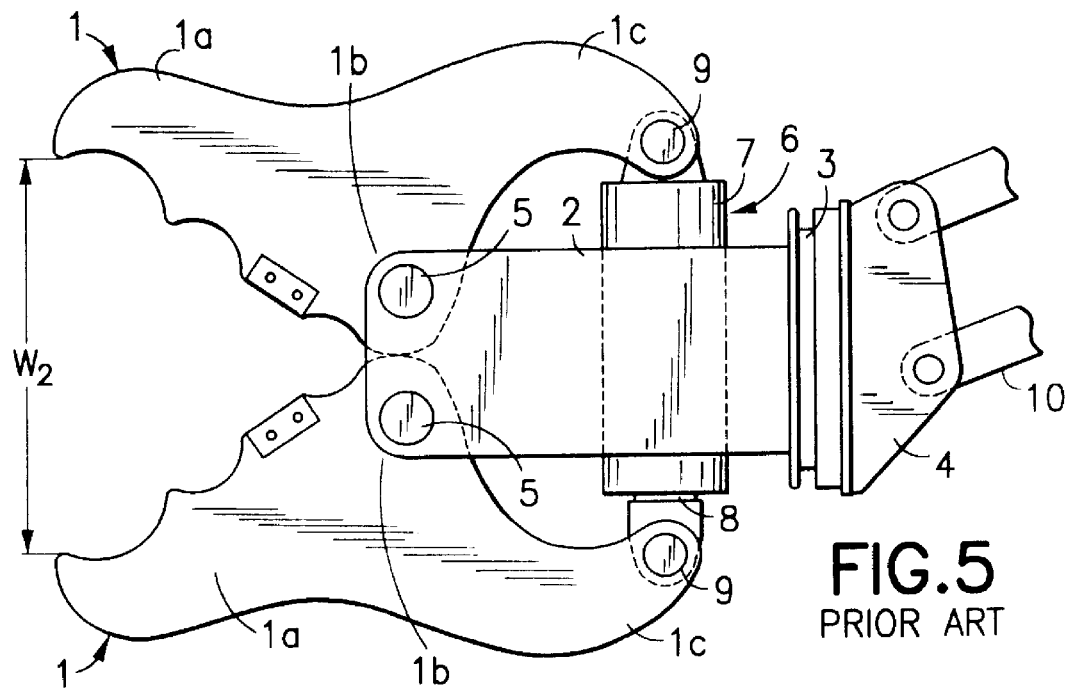
FIG. 5 is a side-view drawing of a prior art crushing device when the rotatable jaws are open.
Figure 6:
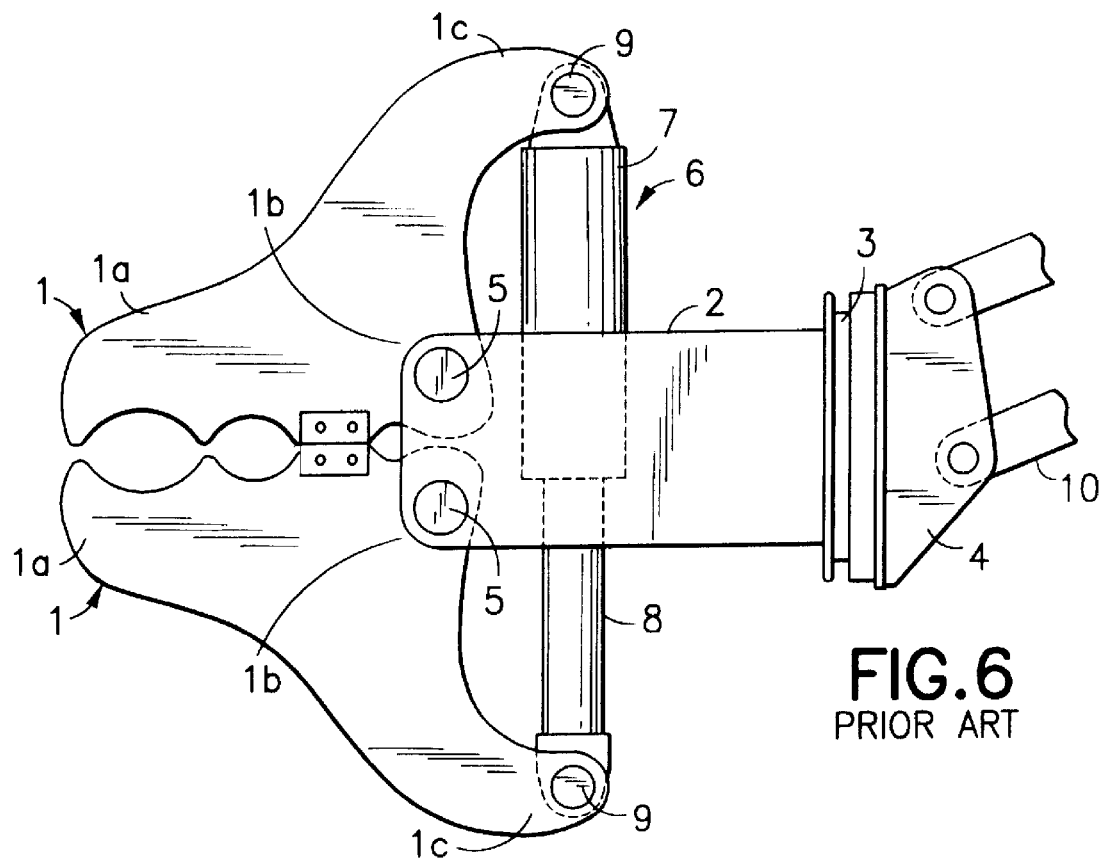
FIG. 6 is a side-view drawing of the device in FIG. 5 when the rotatable jaws are closed.
Figure 7A:
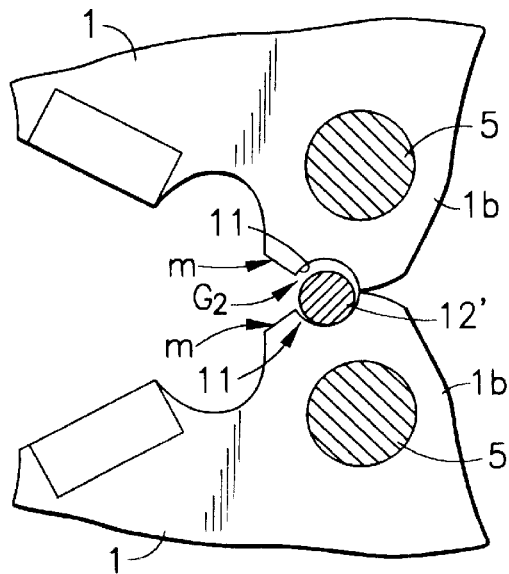
FIG. 7(A)–7(C) are schematic side views of the device in FIG. 5 showing relationships between cavities in the rotatable jaws of the device of FIG. 5 and a synchronization pin when the jaws are in closed and opened positions.
Figure 7B:
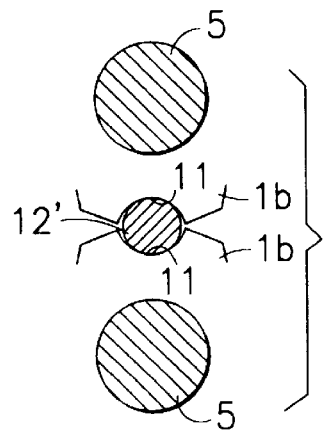
Figure 7C:
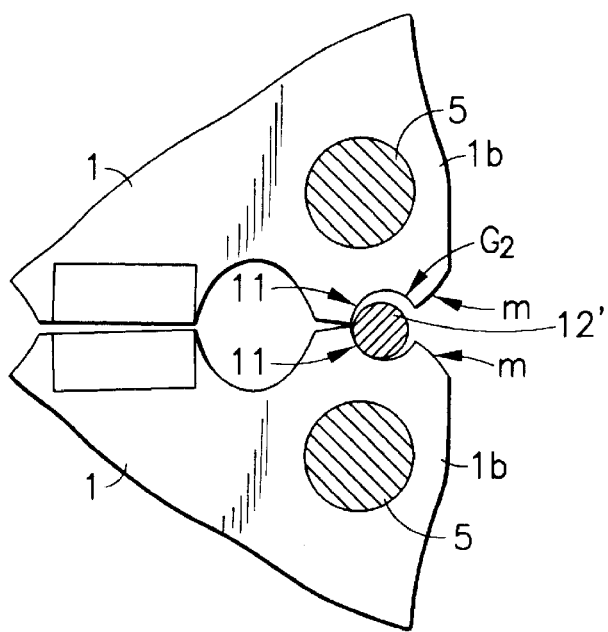

Referring to FIG. 4, the center portion of frame 2 forms an open box shape. Hydraulic actuator 6 is positioned near the rear of frame 2 within frame 2. Cylinder pin 9 is fitted to the end of hydraulic actuator 6 and rear end 1c of rotatable jaw 1 via a retainer 31, a pin lock 32, a bushing 35, and a seal 36. Bolts 33, 34 are used for attachment.

Figure 3A:
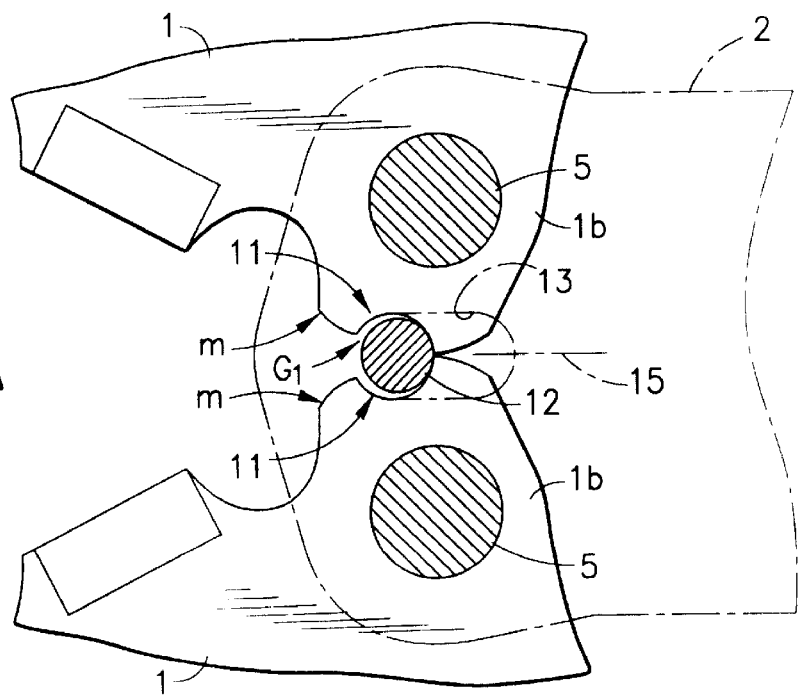
FIG. 3(A) is a schematic side view of the device in FIG. 1 showing relationships between cavities in the rotatable jaws of the device of FIG. 1 and a synchronization pin when the jaw is in the open position.
Figure 3B:
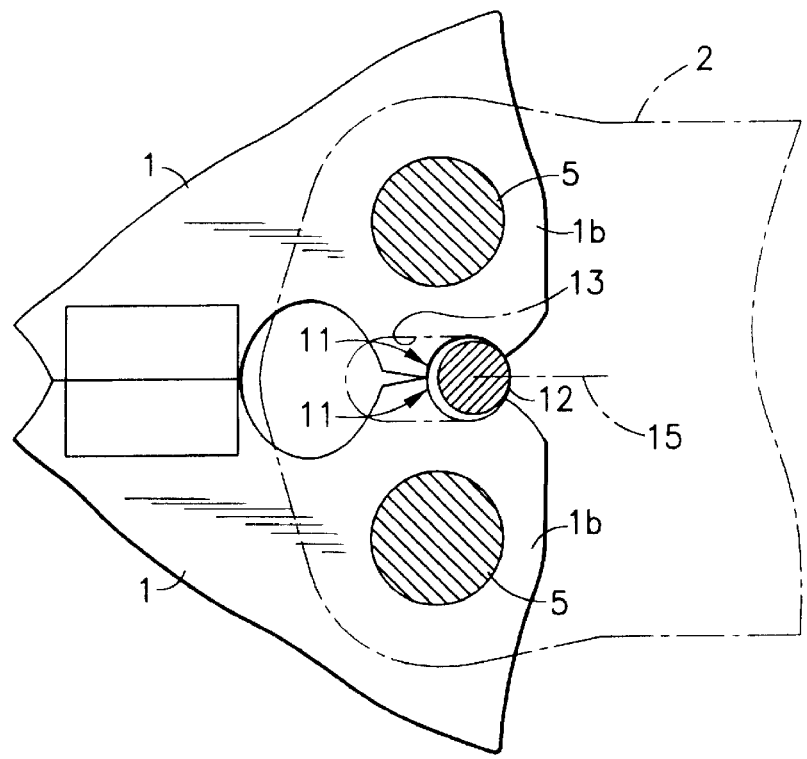
FIG. 3(B) is a schematic side view of the device in FIG. 1 showing relationships between cavities in the rotatable jaws of the device of FIG. 1 and the synchronization pin when the jaw is in the closed position.

Referring to FIGS. 3(A) and 3(B), semi-circular cavities 11 in arcuate bearing end surfaces m are located at equal distances from the centers of pivots 5 of rotatable jaws 1. fitted Between cavities 11, circular synchronization pin 12 moves along a center line 15 which is in the plane of bilateral passing between rotatable jaws 1. That is, rotatable jaws 1 are disposed symmetrically around center line 15. A center of synchronization pin 12 is positioned along center line 15.

Additionally, guide slot 13 of frame 2 is a slot extending along the direction of center line 15. Guide slot 13 slidably supports the two ends of synchronization pin 12, fitted between cavities 1 1, along center line 15. The total length of guide slot 13 is set according to the displacement stroke of synchronization pin 12. The displacement stroke corresponds to the range of positions of synchronization pin 12 as rotatable jaws 1 are moved between the closed opened positions.

As shown in FIGS. 1 and 3(A) when rotatable jaws 1 are opened to maximum width W1, cavities 11 and synchronization pin 12 are at their forwardmost position, and the ends of synchronization pin 12 are displaced to the forward end of guide slot 13. As shown in FIGS. 2 and 3(B), when rotatable jaws 1 are closed, cavities 11 and synchronization pin 12 are positioned at their rearmost position, and the two ends of synchronization pin 12 are displaced to the rear end of guide slot 13. As rotatable jaws 1 are opened or closed, the position of synchronization pin 12 is constrained by guide slot 13 so that its center moves backward and forward along center line 15 between rotatable jaws 1.

As rotatable jaws 1 open or close, synchronization pin 12 moves back and forth, always remaining on center 15 at symmetrical position between cavities 11. This forces rotatable jaws 1 to open and close in opposite directions in synchrony. Guide slot 13 constrains synchronization pin 12 to move forward and backward only. This makes it possible to equalize or minimize gap G1 between cavities 11 of rotatable jaws 1 and synchronization pin 12. This in turn reduces relative looseness in rotatable jaws 1 in the opened position. By minimizing gap G1, it is possible to increase the maximum opening width W1 for rotatable jaws 1.

Furthermore, since guide slot 13 maintains synchronization pin roughly at the midpoint between cavities 11, synchronization pin 12 is always kept in even frictional engagement without being more toward either one or the other of cavities 11. This means that wear and deformation of synchronization pin 12 is reduced and the life-span is greatly increased.

Also, when maximum width W1 of rotatable jaws 1 is increased, it is possible for the looseness in rotatable jaws 1 due to gap G1 to become significant. To prevent this, a pair of stoppers 14 on frame 2 are used. Stoppers 14 are integral elements projecting from the rear end of frame 2, and take the form of L-shaped claw pieces. Projections 1d project from rear ends 1c of rotatable jaws 1 and are positioned so that when rotatable jaws 1 are opened to maximum width W1, the ends of projections 1d press against the ends of stopper 14. With this arrangement, the opening width of rotatable jaws 1 is kept equal, and the looseness that accompanies uneven opening of the jaws is decreased. This provides for more stable positioning of rotatable jaws 1, and results in improved efficiency in crushing operations.

Referring to FIG. 4, the following is a description of an example of a specific structure of a crushing device according to the embodiment described above. A cutter 20 is fixed to end la of rotatable jaw 1 via a bolt 21, a spring washer 22, and a nut 23. Pivot 5 is fitted to frame 2 via a bushing 24, an 0-ring 25, and a pin stopper 26. A grease nipple 27 is mounted on pivot 5. Synchronization pin 12 is fitted into guide holes 13, formed as holes on the two side walls of frame 2. Grease nipples 28 and pin holders 29 are mounted on the ends of synchronization pin 12. Pin holder 29 is fixed to frame 2 via a bolt 30.

Note that although in the embodiment described above, the jaws are actuated by a linear hydraulic actuator, it is possible and well within the purview of the teachings of the current specification combined with the scope of knowledge of a practitioner in the relevant field to practice the invention, as defined by at least some of the following claims, using a non-linear actuator, for example a rotary actuator. The same is true of non-hydraulic actuators such as electromagnetic, pneumatic actuators, etc. Such variations are considered within the bounds of at least some of the claims that follow.

Note also that although the jaws of the embodiment described above are shaped for cutting, it would be clear to a person of ordinary skill, with the benefit of the present disclosure, that the invention could be applied to working elements of various shapes used to cut, compress, or work materials in other ways. Such variations are considered within the bounds of at least some of the claims that follow.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims. For example, the present invention can also be implemented for a crushing device that opens and closes two rotatable jaws independently using two oil-pressure cylinders.

What is claimed is:

1. A cutting/crushing device, comprising:
   a frame;
   two jaws pivotally mounted on said frame in a substantially symmetrical arrangement defining a plane of symmetry, said plane of symmetry lying between said two jaws;
   an actuator connected to at least one of said two jaws;
   a guide recess on each of said two jaws;
   a synchronization element guided for movement with respect to said frame along a line in said plane of symmetry;
   said synchronization element fitting into each of said guide recesses such that as one of said two jaws is pivoted, the other of said two jaws pivots substantially symmetrically in synchrony therewith.

2. A device as in claim 1, wherein said synchronization element is a pin.

3. A device as in claim 2, wherein said actuator is connected between said two jaws forcing said two jaws to pivot oppositely relative to each other.

4. A device as in claim 2, wherein said synchronization element is guided for movement by a slot in said frame.

5. A device as in claim 1, wherein said actuator is connected between said two jaws forcing said two jaws to pivot oppositely relative to each other.

6. A device as in claim 5, wherein said synchronization element is guided for movement by a slot in said frame.

7. A device as in claim 1, wherein said synchronization element is guided for movement by a slot in said frame.

8. A device as in claim 1, wherein said actuator is connected between said two jaws forcing said two jaws to pivot oppositely relative to each other.

9. A cutting/crushing device, comprising:
   a frame;
   two jaws, each having a forward end, a rear end, and a central portion;
   each of said two jaws being pivotally mounted on said frame to pivot about a pivot point in said central portion;
   said two jaws being positioned in a substantially symmetrical arrangement defining a plane of symmetry, said plane of symmetry lying between said two jaws;
   an actuator having two actuator ends, each actuator end connected to a different one of said rear ends, whereby said rear ends are forcibly separated and brought together to open and close said forward ends;
   each of said two jaws having at least one arcuate surface with a center of curvature at said pivot point of said each of said two jaws;
   said arcuate surfaces being adjacent;
   at least one guide recess on each of said two jaws in said arcuate surface of said each of said two jaws, whereby said crushing device has at least two guide recesses;
   each of said at least two guide recesses being located opposite another of said at least two guide recesses in a substantially symmetric arrangement about said plane of symmetry;
   at least one synchronization element guided for movement with respect to said frame along a line in said plane of symmetry;
   said at least one synchronization element fitting into a respective opposite pair of said at least two said guide recesses such that as one of said two jaws is pivoted, the other of said two jaws pivots substantially symmetrically in synchrony therewith.

10. A device as in claim 9, wherein said at least one synchronization element is a pin.

11. A device as in claim 10, wherein said actuator is a linear actuator pivotally connected to each of said two jaws.

12. A device as in claim 10, wherein said at least one synchronization element is guided for movement by a slot in said frame.

13. A device as in claim 9, wherein said actuator is a linear actuator pivotally connected to each of said two jaws.

14. A device as in claim 13, wherein said at least one synchronization element is guided for movement by a slot in said frame.

15. A device as in claim 9, wherein said at least one synchronization element is guided for movement by a slot in said frame.

16. A device as in claim 9, wherein said actuator is a linear actuator pivotally connected to each of said two jaws.

17. A compressing device, comprising:
   a frame;
   two working members, each having a working end;

each of said two working members being pivotally mounted on said frame;

pivot points of said two working members being located on said frame such that working ends of said two working members may converge and diverge;

a guide element movably attached to said frame for movement along a line;

respective portions of said working members having engagement surfaces positioned to engage said guide element at all points throughout a range of pivoting of said working members, said engagement surfaces and said guide element being so shaped, and said pivot points being so positioned, that said working members are forced to pivot in substantial synchrony in opposite directions about respective ones of said pivot points.

18. A device as in claim 17, wherein said guide element is a cylindrical member and said engagement surfaces are surfaces of respective recesses in said two working members.

19. A device as in claim 18, guide element is guided for movement by a slot in said frame.

20. A device as in claim 17, guide element is guided for movement by a slot in said frame.

* * * * *